United States Patent [19]

Graves et al.

[11] Patent Number: 5,046,395

[45] Date of Patent: Sep. 10, 1991

[54] TWO FAULT TOLERANT TOGGLE-HOOK RELEASE

[75] Inventors: Thomas J. Graves, Parker, Colo.; Christopher W. Brown, Houston, Tex.

[73] Assignee: The United States of America as represented by the Administrator of the National Aeronautics and Space Administration, Washington, D.C.

[21] Appl. No.: 603,337

[22] Filed: Oct. 25, 1990

[51] Int. Cl.⁵ ............................................. B64D 1/12
[52] U.S. Cl. ..................................... 89/1.14; 89/1.57; 102/378; 294/82.26
[58] Field of Search ............... 294/82.26, 82.29, 82.31, 294/82.33, 82.34; 102/377, 378; 89/1.14, 1.57

[56] References Cited

U.S. PATENT DOCUMENTS

| | | | |
|---|---|---|---|
| 2,489,984 | 11/1949 | Shoemaker | 89/1.57 |
| 2,779,283 | 1/1957 | Baughman | 102/377 |
| 3,071,404 | 1/1963 | Van Hove | 102/378 |
| 3,116,663 | 1/1964 | Musgrave | 294/82.26 |
| 3,200,706 | 8/1965 | Kinard | 89/1.57 |
| 3,445,133 | 5/1969 | Reischl | 294/82.32 |
| 3,477,333 | 11/1969 | Boyd et al. | 102/377 |
| 3,600,031 | 8/1971 | Coleman et al. | 294/82.32 |
| 3,666,216 | 5/1972 | Nagy et al. | 294/82.32 |
| 4,173,366 | 11/1979 | Mattei et al. | 294/82.32 |
| 4,179,150 | 12/1979 | Conrad et al. | 294/82.32 |
| 4,682,804 | 7/1987 | Palmer et al. | 294/82.26 |
| 4,836,081 | 6/1989 | Graves et al. | 89/1.14 |
| 4,864,910 | 9/1989 | King et al. | 89/1.14 |

*Primary Examiner*—David H. Brown
*Attorney, Agent, or Firm*—Russell E. Schlorff; Harold W. Adams; Edward K. Fein

[57] ABSTRACT

A coupling device which is mechanically two fault tolerant for release. The device comprises a fastener plate 11 and fastener body 12, each of which is attachable to a different one of a pair of structures to be joined. The fastener plate 11 and body 12 are coupled by an elongate toggle 13 mounted at one end in a socket on the fastener plate for universal pivotal movement thereon. The other end of the toggle 13 is received in an opening in the fastener body 12 and adapted for limited pivotal movement therein. The toggle is adapted to be restrained by three latch hooks 55 arranged in symmetrical equiangular spacing about the axis of the toggle, each hook being mounted on the fastener body 12 for pivotal movement between an unlatching non-contact position with respect to the toggle and a latching position in engagement with a latching surface 44 of the toggle. The device includes releasable lock means 61, 63 for locking each latch hook 55 in its latching position whereby the toggle couples the fastener plate to the fastener body and means 70, 72 for releasing the lock means to unlock each said latch hook from the latch position whereby the unlocking of at least one of the latch hooks from its latching position results in the decoupling of the fastener plate from the fastener body.

9 Claims, 5 Drawing Sheets

TWO FAULT TOLERANT TOGGLE-HOOK RELEASE

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates generally to releasable coupling devices and more particularly to a coupling mechanism which is mechanically two fault tolerant for effecting a remote controlled release of a releasable structure from a base structure.

BACKGROUND ART

Releasable coupling devices, including fluid-actuated releasable fasteners, which are responsive to remote controlled operation are used in a variety of operating environments. For aerospace applications, wherein the potential for catastrophic failure has imposed a continuing need for increasing the reliability of such devices, mechanically two fault tolerant systems have been devised to provide redundant release means. Mechanically two fault tolerant systems, which employ three latch pins that are retractable from a toggle latching member, are shown in U.S. Pat. Nos. 4,864,910 and 4,836,081. Such systems, however, have design load limits relating to the bending stress of the pins. It has been found that unexpected large tensile forces applied at the separation plane of the coupling systems, can permanently deform the pins such that the "bent" pins may not retract and therefore lead to a failure in separating. Other disadvantages are that the three pin layout design requires considerable use of space in the plane perpendicular to the preload vector, which space requirement increases as the demand for preload increases. The preloading on the pins induces high friction forces making the pins harder to retract and requiring greater retraction forces. Also, valuable area on the piston face needed for application of pressure to retract a pin is taken up by the shaft of the pin.

In U.S. Pat. No. 4,682,804 there is disclosed a release mechanism for spacecraft wherein a pair of locking surfaces engage opposite sides of a pivoted pawl tab. The mechanism is one fault tolerant in that if only one of the locking surfaces be released, the panel tab pivots to release the other surface. The prior art also includes releasable fasteners which are zero fault tolerant in that failure of any one component results in a failure to release. Since such zero fault tolerant and one fault tolerant systems do not provide the degree of redundancy inherent in a two fault tolerant system they are therefore less desirable for many aerospace applications.

STATEMENT OF THE INVENTION

The invention is an improved fluid-actuated releasable coupling which is particularly suited for releasably connecting structures in the space environment or in any other releasing application where reliability is of critical importance. The releasable coupling device comprises a fastener plate and a fastener body, each of which is separately attachable to a different one of a pair of structures to be releasably joined. The fastener plate and fastener body members are adapted to be fastened to one another by a toggle which is supported at one end in a concave spherical bearing surface in a socket carried by the fastener plate and adapted for universal pivotal movement thereon. The other end portion of the toggle is adapted to be constrained by three latch hooks which are mounted for pivotal movement in the fastener body in a symmetric equiangular spacing about the axis of the toggle. Each latch hook is provided with a latch surface and is pivotally moveable between a position wherein it is in a non-contact out-of-the-way relation with respect to the toggle to a position wherein the latch hook cooperably engages a corresponding latch surface on the toggle. The coupling device of the invention includes releasable lock means for locking each latch hook in its latching position whereby the toggle is restrained by the latch hooks at three equally spaced contact points and thereby couples the fastener plate to the fastener body. The releasable lock means is also responsive to the selective application of fluid pressure to unlock the latch hooks from their latch positions such that the unlocking of any one or more of the latch hooks results in the decoupling of the fastener plate from the fastener body.

DETAILED DESCRIPTION OF THE INVENTION

Figure 1:
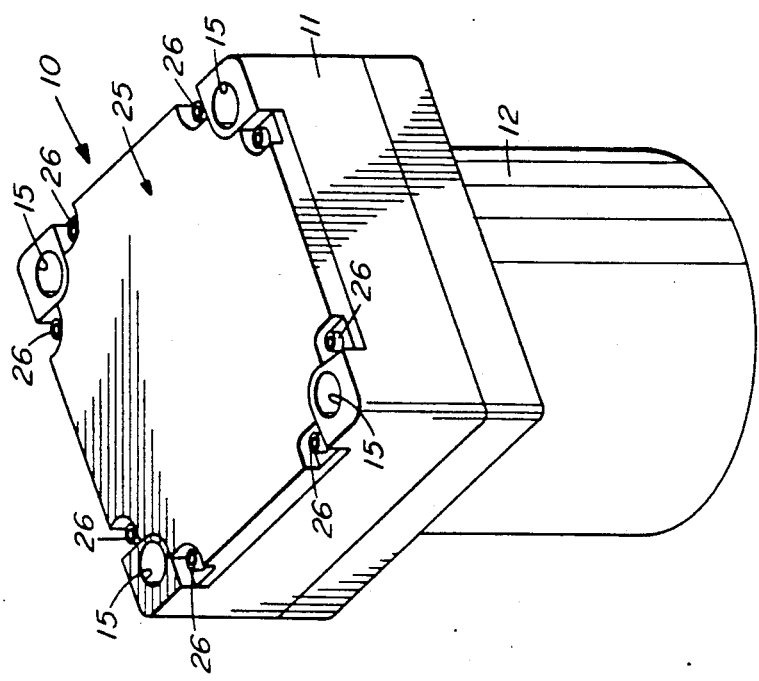
FIG. 1 is a view in perspective of a releasable coupling device, representing a preferred embodiment of the invention.

Referring more particularly to the drawings, there is shown in FIG. 1, a releasable coupling device 10 which represents a preferred embodiment of the invention. The coupling device 10 comprises a fastener plate 11 and a fastener body 12 which are adapted to be releasably coupled by a toggle 13 when placed in engagement with one another by tongue and groove connections 14a,14b. The fastener plate 11 and the fastener body 12 may also be provided with bolt holes, such as the holes 15 in plate 11 and holes (not shown) in fastener body 12, for accommodating their rigid connection to a pair of structures to be joined so that the joined structures are releasably fastened by the coupling device 10. However, the fastener plate 11 and fastener body 12 may be secured to the structures by welding or other suitable means.

Figure 3:
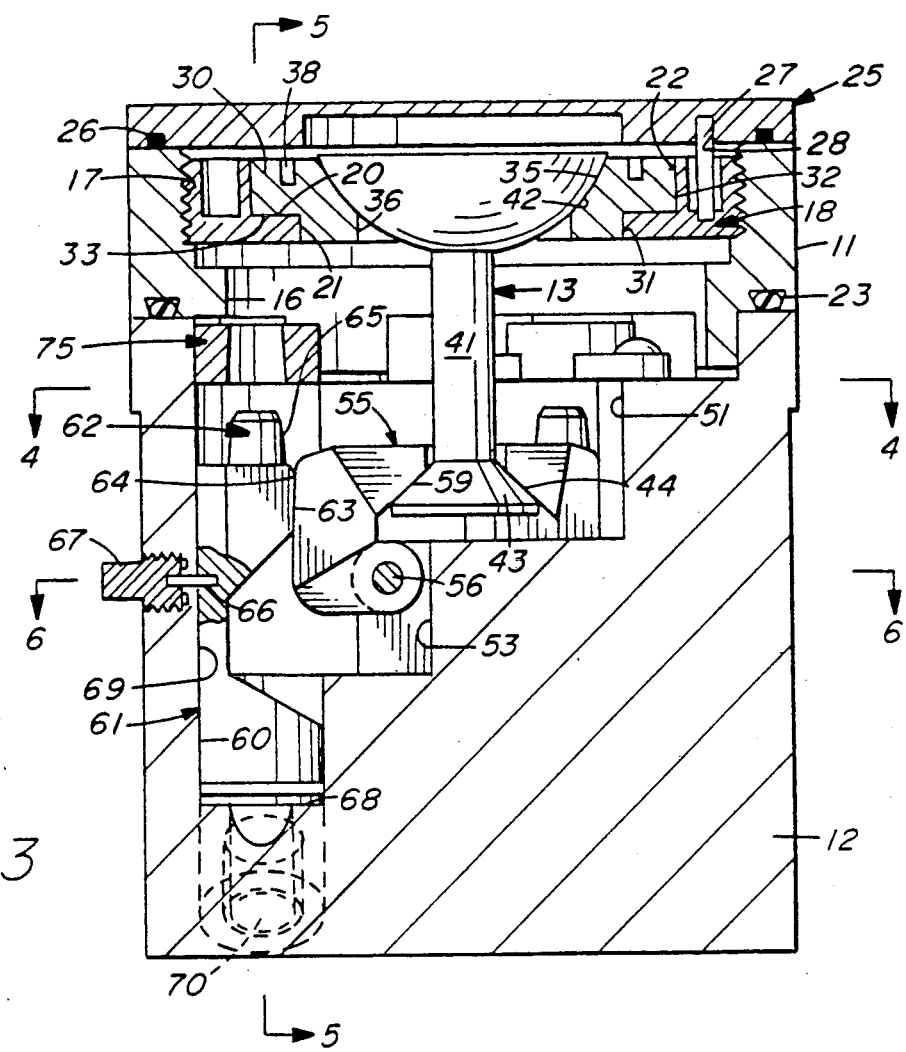
FIG. 3 is a vertical cross section view of the releasable coupling device of the invention, showing one of the latching hooks of the device locked in engaged latching condition with the toggle member of the invention.
Figure 9:
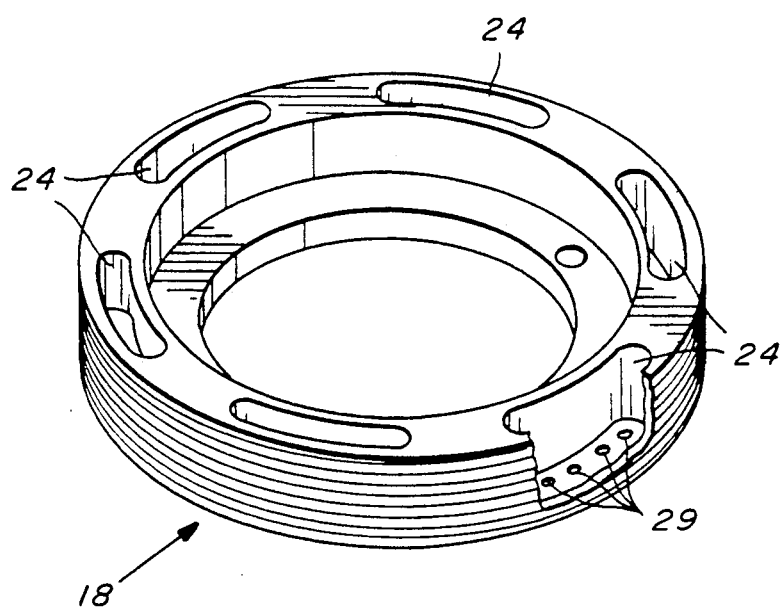
FIG. 9 is a view in perspective of an annular bolt which is used to apply a preload to the coupling device, with part of the bolt being broken away to show structural details.

As can be seen in FIG. 3, the fastener plate 11 is provided with a central axial bore having a reduced diameter portion 16 and a larger diameter internally threaded portion 17 for receiving an externally threaded annular bolt 18. The bolt 18 is provided with a central axial bore which is counterbored to provide an upward facing annular shoulder 20, a reduced diameter bore section 21 and a larger diameter bore section 22. The end face of the bolt 18, as best seen in FIG. 9, is provided with a plurality of arcuate slots 24 whereby a tool might be applied thereto for effecting the threading of the bolt 18 into the threaded bore portion 17 of the fastener plate.

A cover plate 25 is also provided which is adapted to be bolted atop the fastener plate by means of bolts 26. The cover 25 includes equiangularly spaced holes 28 which are adapted to receive a retention pin 27, one of which is provided for insertion in each of the arcuate slots 24 in the annular bolt 18 and received in a pin-receiving blind bore 29 formed therein. In the embodiment of the invention shown herein, there are sixty holes 28 arranged in a circle (not shown) in equiangular 6° spacing in the underside of the cover plate 25, and in the bottom of at least one arcuate slot 24, there are five blind bores 29 arranged in equiangular spacing of 7½°. After the bolt 18 is threaded to a position in the fastener plate bore 17, normally selected to effect a preloading of the coupling device 10 as will hereinafter be described, a retention pin 27 is inserted in a bore hole 29 in one of the arcuate slots 24 of the bolt 18. The cover plate is then applied such that the pin 27 is received in an accommodating hole 28 and blind bore 29. The cover plate 25 and the fastener plate 11 are adjusted as necessary with respect to their relative rotary position to insure the placement of the holes 28,29 in registry for insertion of the pins 27 which serve to prevent dislocation of the bolt 18. The cover plate 25 is also provided with a seal 26 on its underside and adjacent its periphery to provide a fluid-tight sealing connection with fastener plate 11. A seal 23 on the underside of fastener plate 11 establishes a fluid-tight connection between the plate 11 and body 12.

The annular bolt 18 is also provided with an annular socket 30 which has external diameters 31,32 corresponding to the internal diameters of the bore sections 21,22, respectively, and a downward-facing annular shoulder 33 for engaging the shoulder 20 of the bolt 18 whereby the socket 30 is adapted to seat thereon.

Socket 30 is also provided with a large central cavity defined by a segment of a concave spherical bearing surface 35, the bottom of which is penetrated by an axial bore 36 in concentric coaxial relation therewith.

The toggle member 13 is sized and configured so as to be insertable through the axial bore 36 of the socket 30 and is provided with a stem section 41 and an enlarged hemispherical end portion having an external surface 42 which conforms to that of the bearing surface 35 of the socket cavity. At its other end, the toggle is provided with a flared end portion 43 defining a frusto-conical surface 44 terminating at an external diameter slightly smaller than that of the axial bore 36 of socket 30 whereby the toggle member 13 may be inserted through the socket 30 with its hemispherical end portion 42 seated on the spherical bearing surface 35 of the socket cavity. Accordingly, the toggle is adapted for universal pivotal movement limited only by the wall of bore 36.

The fastener body 12 is provided with a central bore 51 which axially aligns with the central bores of the socket 30, bolt 18 and fastener plate 11 when the fastener plate 11 and fastener body 12 are bolted to the structures to be releasably connected. The dimensions of the bore 51 are such as to easily accommodate the flared end portion 43 of the toggle member 13 when the toggle member is seated in the socket 30 and to allow free pivotal movement of the toggle member to the extent permitted by its mounting on the socket 30.

Figure 4:
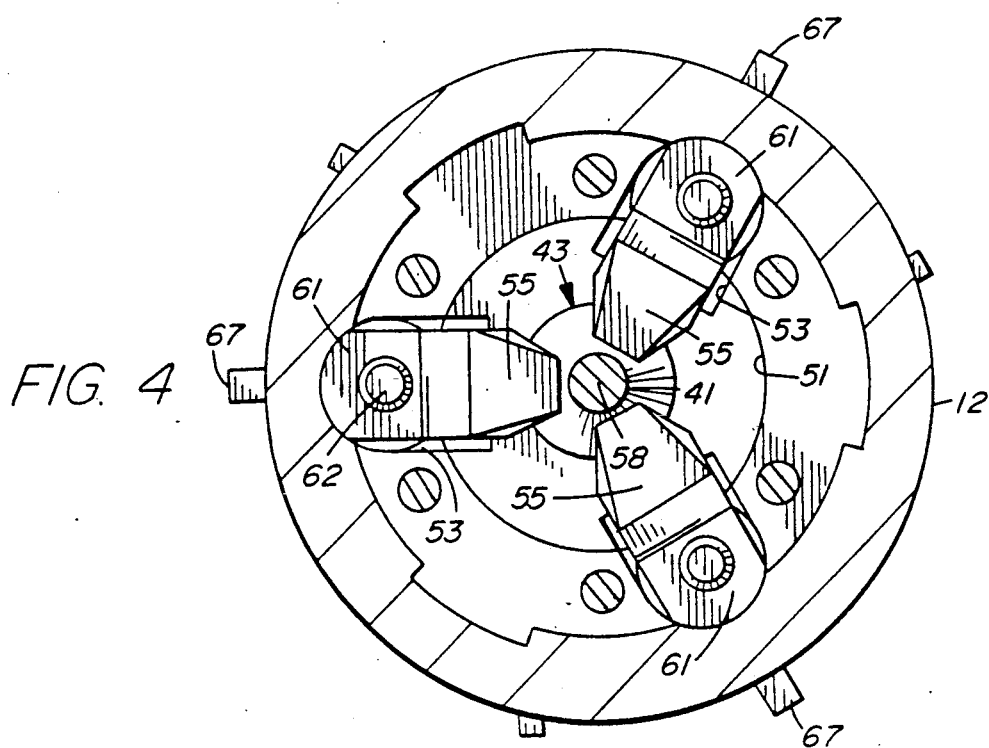
FIG. 4 is a view of the releasable coupling device of the invention as taken along the section line 4—4 in FIG. 3.
Figure 6:
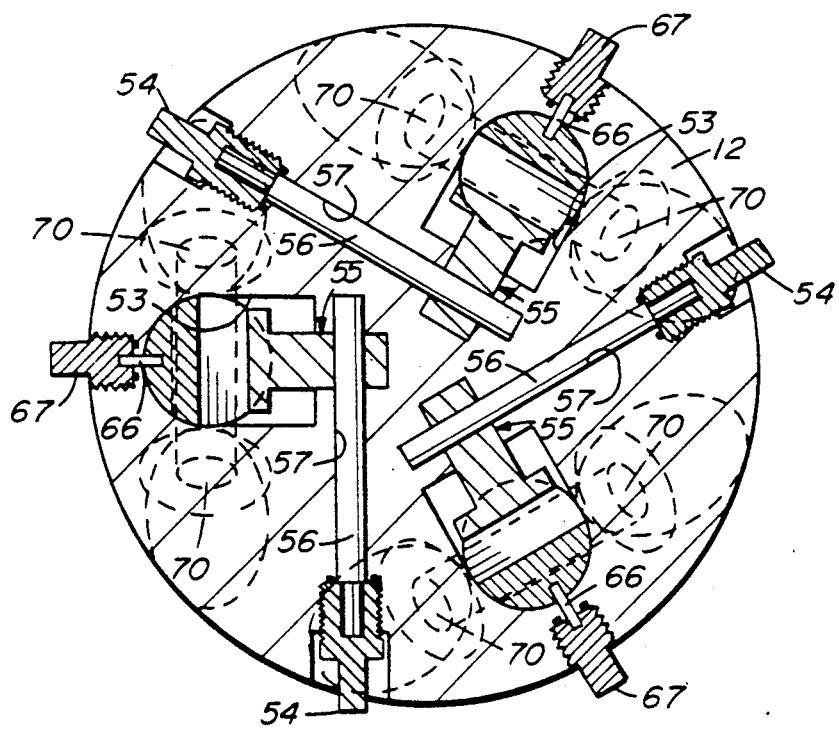
FIG. 6 is a view of the releasable coupling device of the invention as taken along the section line 6—6 in FIG. 3.

The fastener body 12 is further provided with three hollowed-out cavities 53 which open into the bottom surface of the central bore 51. Each of the cavities 53 accommodates a latch hook 55 which is pivotally mounted on a pivot pin 56. The fastener body 12 is provided with three pin-receiving bores 57 which receive the pins 56 and extend from the outer surface of the fastener body in off-set eccentric relation to the axis 58 of the central body bore 51, as best shown in FIG. 6 and FIG. 4. At their outer ends, each pin 56 is provided with a cap 54 with external flat surfaces and external threads to facilitate its proper positioning in the bore 57 and its retention on the fastener body 12. The outer end of the pin 56 is received in a blind bore in the cap 54 and is therefore freely rotatable therein. The latch hooks 55 are pivotally mounted on the pins 56 at locations which are equidistant from the axis 58 and also in equiangular spacing about the axis 58. Each latch hook 55 is provided with a flat latching surface 59 so that each latch hook 55 is adapted to be pivoted towards the toggle 13 to a position where its latching surface 59 is in engagement with the frusto-conical surface 44 of the toggle. Preferably, the toggle may be provided with flat areas (not shown) in the surface 44 for engagement with the hook latching surfaces 59.

The fastener body 12 is also provided with three piston-receiving bores 60, each of which opens to a different one of the cavities 53. In each bore 60, a piston 61 is slidably mounted therein and includes a locking surface 63 which in one position of the piston engages the cooperable locking surface 64 on the back side of a latch hook 55 and locks the latch hook in a position wherein its latching surface 59 conformingly engages the surface 44 of the toggle. Each piston 61 is adapted to be retained in its locking position by means of a shear pin 66 which extends from a cap 67 threaded into the outer surface of the fastener body into an accommodating bore formed in the piston 61, thereby preventing the piston 61 from movement in its piston-receiving bore 60. Each shear pin cap 67 includes external threads and at its outer end is formed with flat surfaces to facilitate its being threaded into the fastener body 12.

It is to be noted that each piston-receiving bore 60 bottoms out in a radially planar surface 68 which is perforated by a pair of fluid pressure receiving ports 70, formed in the underside of the fastener body 12 and communicating with the bore 60. Each port 70 is formed by a threaded bore so as to accommodate a fitting on the end of a conduit leading from a source of fluid pressure or the threaded end of a pyrotechnic initiator or explosive squib 72 of the type having a metallic housing with a threaded end portion for accommodating its installation in a charge receiving chamber such as the port 70. Two such ports 70 are provided for each piston-receiving bore 60 for purposes of redundancy. It is possible, however, to utilize other forces to drive the pistons such as mechanical means, the action of electrical solenoids or chemical action.

Figure 5:
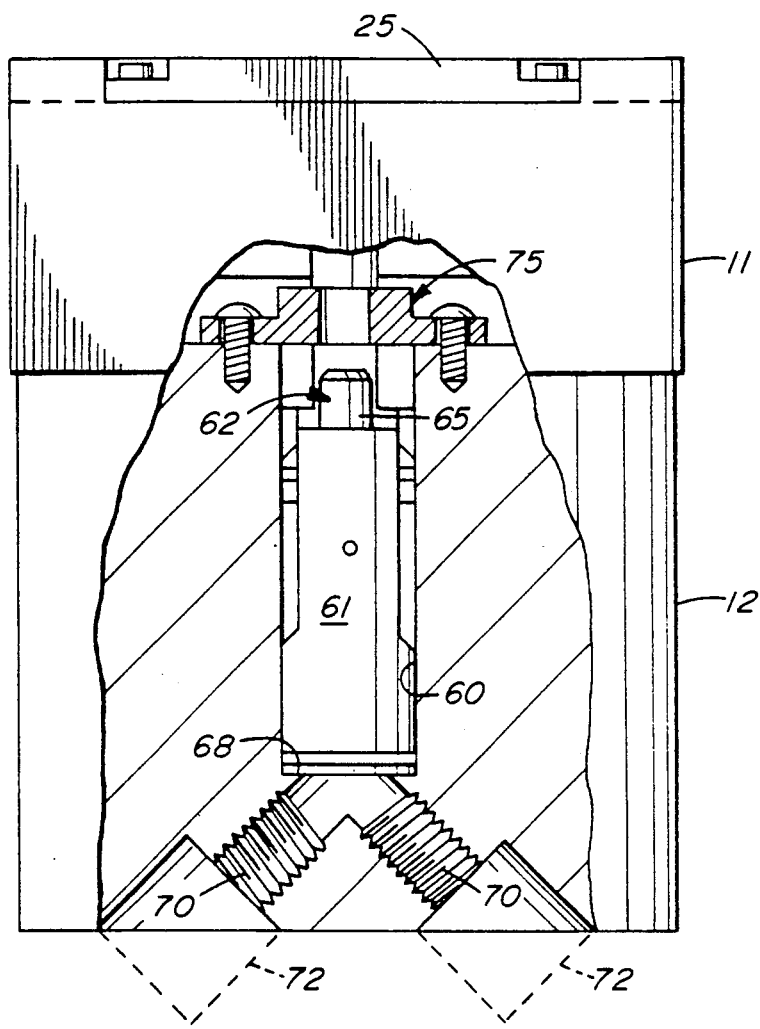
FIG. 5 is a side view of the releasable coupling device of the invention, parts of which are broken away to show details of a fluid-actuated piston used for releasably locking one of the latch hooks of the invention in a latching condition.

It is preferred that the piston 61 be of such length that when in its locking position and retained by a shear pin 66 it is also seated on the bottom surface 68 of the bore 60. On the detonation of a pyrotechnic charge 72, shown in dashed lines in FIG. 5, explosive gases delivered to the ports 70 apply fluid pressure to the end face of a piston 61 which drives the piston upwardly, severing the shear pin 66 and removing the locking surface 63 of th piston from the cooperative locking surface 64 of a latch hook 55. The upward movement of the piston 61 is limited by a piston stop 75 which is bolted onto the fastener body and includes an annular opening sized to receive a projection 62 formed on the top end of the piston 61. Preferably, a taper lock is provided by means of the frusto-conical surface 65 of the projection 62 and the frusto-conical surface which defines the annular opening in the stop 75.

Each piston 61 is formed with a large lateral recess 69 on the side thereof which faces the adjacent latch hook 55 so that when the piston 61 is actuated to its uppermost position controlled by the piston stop 75, the latch hook 55 may be pivotally moved away from its latching position on the toggle 13 at the slightest urging and without interference by the piston 61.

Normally, such urging is provided by release of the coupling device 10 from a preload condition. Although the fastener may be assembled in its latching condition and released without any significant loading on the toggle 13, an axial preload is required for many applications. Such a preload, conceivably zero to thousands of pounds, can be applied by rotation of the bolt 18 so that it is threaded outwardly of the plate bore 16 by a sufficient distance to apply a predetermined axial loading on the toggle 13 with the socket 30 being held from rotating during preloading by an appropriate tool placed in blind bores 38 in the face of socket 30. In space vehicle assemblies, preloading is desirable to enable the coupling to withstand the stresses incurred at the time of launch and boost phases and landing without exhibiting fatigue. However, releasing without a preload can be done by an external force, such as by springs or by maneuvering of an Orbiter space vehicle away from the structure to be separated as inertia of the separating structure serves to maintain its orbital position.

While in most separating applications a simultaneous detonation is to be preferred, the charge devices 72 could be individually detonated in a selected sequence and firing circuits provided accordingly.

Figure 2:
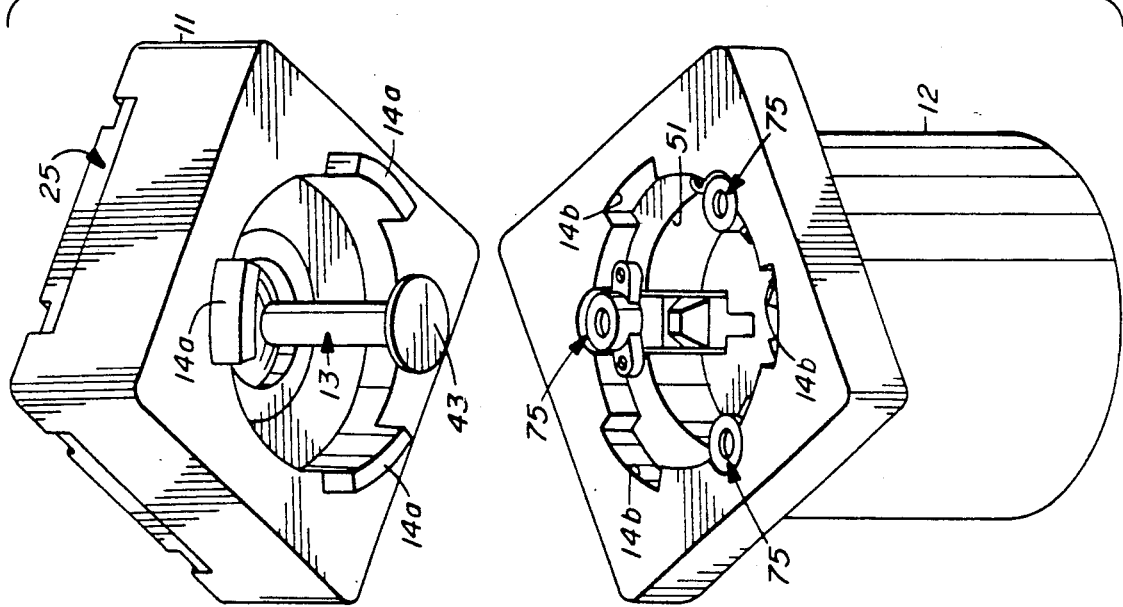
FIG. 2 is an exploded view in perspective of the principal components of the releasable coupling device of FIG. 1.

If all explosive charges 72 are detonated simultaneously and there is successful simultaneous unlocking of the latch hooks 55, the loads applied by the latch hooks on the toggle 13 will be simultaneously removed and the toggle will be free to move in a substantially axial direction; however, if there is a failure of any one or two of the pistons 61 to move to unlock, the loading force applied to the toggle end 43 by a latch hook or pair of hooks 55 still in contact therewith, will cause the toggle to cant or pivot on its universal mounting in the fastener plate 11 as shown in FIG. 2 so that it escapes from constraining contact with the latch hooks. Release of the toggle 13 allows separation of the fastener plate 11 from the fastener body 12. This pivotal movement of the toggle 13 to escape two unlocked hooks will always occur because the contact points of any one or two of the latch hooks on the toggle end will always push on surface 59 of the toggle. The release of any one or two hooks will leave room for the toggle to pivot clear of the other hooks. Such asymmetric loading to cause pivotal movement of the toggle will also occur if the pyrotechnic charges are fired in sequence or time delayed and the pistons 61 moved to the unlocking position in sequence.

Figure 7:
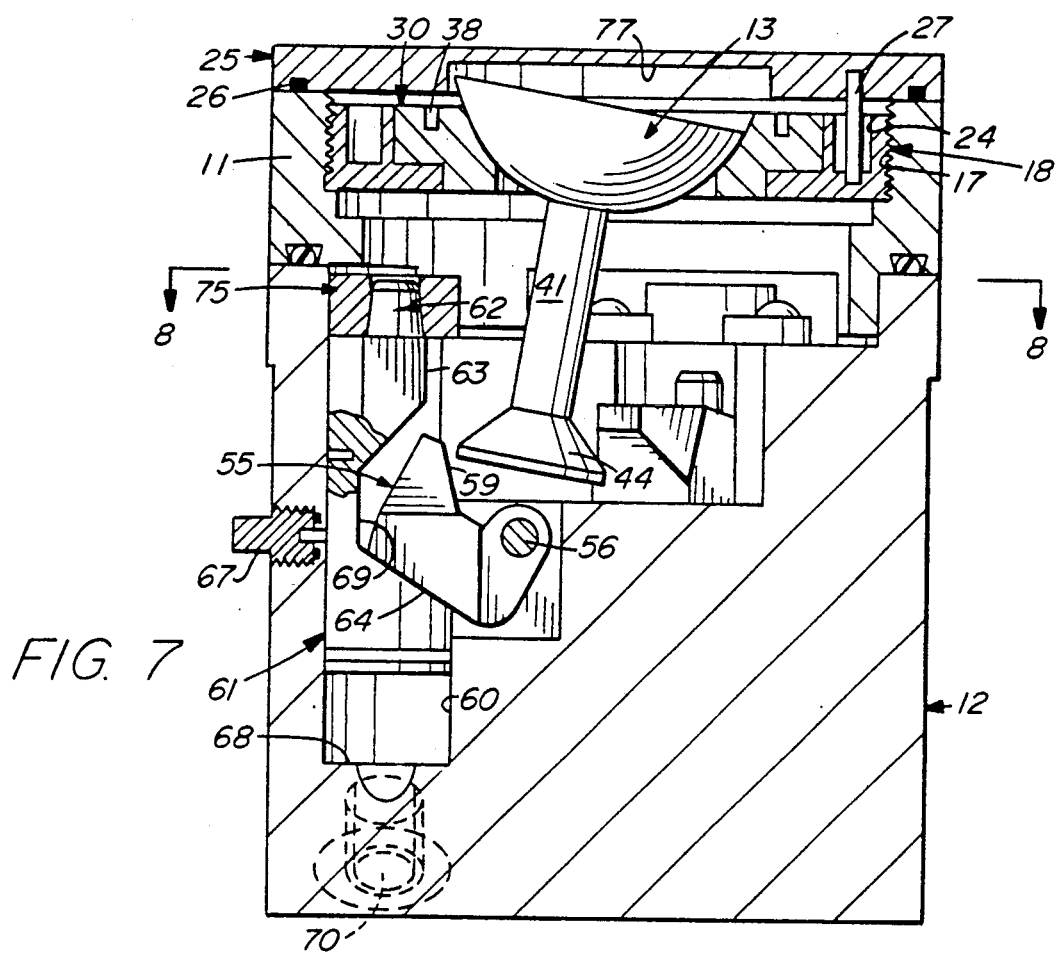
FIG. 7 is a vertical cross section view similar to FIG. 3 but showing one of the latching hooks disengaged from the toggle member.
Figure 8:
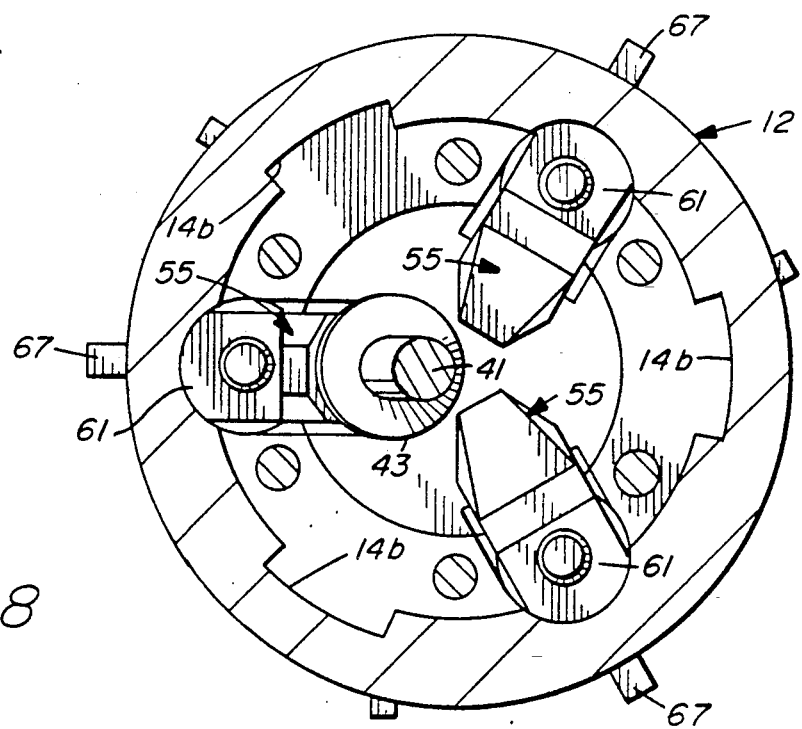
FIG. 8 is a sectional view as taken along the section line 8—8 in FIG. 7.

To insure that the toggle 13 is free to cant or swivel on the unlocking of any one of the latch hooks 55, the cover plate 25 must be sufficiently spaced from the top surface of the toggle 13 when the device is assembled and preload applied. A central circular recess 77 might be provided on the underside of the cover plate if necessary for accommodating such movement of the toggle. See FIG. 7. The cover 25, which seals out moisture, dust and the like also serves to hold the toggle in place after separation.

In the coupling device 10, for this application only, titanium is a preferred material for the fastener plate 11, fastener body, cover 25, and socket 30 whereas INCONEL, a nickel, chromium, iron alloy, is preferred for the toggle 13, the pre-load bolt 18, pivot pins 56 and the latch hooks 55. The pistons 61 and piston stops 75 are of aluminum. A low friction coating is desired. However, the materials should be selected so that the first component to receive permanent deformation will not prevent movement for separation. Various other materials with low friction coating might be substituted, depending on the intended use and particular application of the coupling device 10.

It will therefore be seen that a unique fluid-actuated coupling device is disclosed herein which is mechanically two fault tolerant in effecting release. The failure of combustion of all but one of the explosive devices or any other failure as would cause any one or as many as two of the latch hooks to fail to unlock from the latch position will not prevent the coupling device 10 from effecting a successful release. In the space environment, release of the toggle 13 and simultaneous removal of the axial pre-load on the toggle will normally cause a separation of the fastener plate 11 and fastener body 12 and the large structures associated therewith. However, the coupling device 10 should release without any preload with external forces pulling the coupling device 10 apart. These external forces pulling the device 10 apart will push the hooks 55 back and/or swivel the toggle 13.

It is also to be noted that no primary structure is required to break for effecting a separation, only the shear pin that holds a piston from sliding up or down during assembly and in the case where there is no pre-load applied. Also since a piston pushes forward to effect a release, a greater surface area is available for the pressure to push the piston as compared to a releasable fastener which uses pins to restrain a toggle. Because of the self-containment of the coupling device, there are no free pieces as would constitute debris following a release. A most significant advantage, however, is the coupling device of the present invention can accommodate the plastic deformation of vital latching components and still function.

It is to be understood therefore that the foregoing description of a preferred embodiment of the invention has been presented for purposes of illustration and explanation and is not intended to limit the invention to the precise form disclosed. For example, it is possible to use means other than the expanding gases of pyrotechnic devices for effecting unlocking movement of the pistons 61, such as pneumatic or hydraulic sources of fluid pressure or mechanical or electrical means. It is to be appreciated therefore, that changes may be made by those skilled in the art without departing from the spirit of the invention.

What is claimed is:

1. A two fault tolerant releasable coupling device for releasably joining separable structures, said coupling device comprising:
   a fastener plate and a fastener body, each of which is separately attachable to a different one of the structures to be joined;
   an elongate toggle member for releasably coupling the fastener plate to the fastener body, said toggle member being supported at a first end portion by the fastener plate and mounted thereon by a swivel coupling for universal pivotal movement about said first end portion which is supported by the fastener plate, said fastener body being in a facing relationship to said fastener plate and having an opening in the face of the fastener body disposed towards the fastener plate, said opening being sized to receive the other end portion of said toggle member and to allow limited pivotal movement of the toggle member about said first end portion;
   contact latching surfaces provided on said other end portion of the toggle member in symmetric locations about the axis of the toggle member;
   three latch hooks arranged in symmetrical equiangular spacing about said other end portion of the toggle member, each latch hook being mounted on said fastener body for pivotal movement between an unlatching position wherein each said latch hook is in non-contact relation with said toggle member and a latching position wherein each said latch hook is in engagement with one of the contact latching surfaces of the toggle member whereby the toggle member is engaged and adapted to be restrained by the latch hooks at engagement points symmetrical with respect to the axis of the toggle member when said latch hooks are in their latch position;
   releasable lock means for releasably locking each said latch hook in said latching position wherein said toggle member couples said fastener plate to said fastener body; and
   means for releasing said lock means to unlock each said latch hook from the latch position whereby the unlocking of at least one of the latch hooks from its latching position with respect to the toggle member results in the decoupling of the fastener plate from said fastener body.

2. A two fault tolerant releasable coupling device as set forth in claim 1 further including means for selectively applying an axial preload on the toggle member when the fastener plate and fastener body are coupled together by the toggle member.

3. A two fault tolerant releasable coupling device as set forth in claim 1 further including cooperative means on said fastener plate and said fastener body for precluding relative shear movement and relative axial rotation between said fastener plate and said fastener body when said fastener plate and said fastener body are releasably coupled by said coupling device.

4. A two fault tolerant releasable coupling device as set forth in claim 1 wherein said releasable lock means for releasably locking each said latch hook in its latching position comprises three piston-receiving cylinders in said fastener body;
   three piston members movably received respectively within said cylinders, said piston members and said latch hooks having cooperable locking surfaces wherein each piston member has a locking surface adapted for engagement with a cooperative locking surface of a different associated one of said latch hooks and is movable between a locking position wherein the locking surface of the piston member engages the locking surface of an associated latch hook and retains its associated latch hook in latching engagement with said toggle member and an unlocking position wherein said piston locking surface is disengaged from the latch hook;
   a plurality of retaining means for retaining each said piston member in its locking position, each said retaining means comprising a severable shear pin which interconnects said fastener body and an associated one of said latch hooks, each said piston member being individually responsive to an application of fluid pressure or other means of force to its associated cylinder to sever its shear pin and move from the locking position to the unlocking position wherein its associated latch is unlocked from latching engagement with said toggle member whereby the unlocking of at least one of the latch hooks results in release of the toggle member from said latch hooks and release of said fastener plate from said fastener body by swivel movement of the toggle member.

5. A two fault tolerant releasable coupling device as set forth in claim 4 wherein each said cylinder is provided with a fluid inlet port having means for receiving a fitting therein which is adapted to communicate to each said cylinder the explosive gases resulting from detonation of a pyrotechnic device.

6. A two fault tolerant releasable coupling device as set forth in claim 1 wherein the toggle member is enlarged at said first end and provides a surface defined by a sector of a sphere and said fastener plate is provided with an annular socket member having a bearing surface for accommodating the spherical surface of said first end of the toggle member.

7. A two fault tolerant releasable coupling device as set forth in claim 6 wherein said fastener plate is provided with a threaded opening through the plate and said annular socket member is supported on an annular bolt threaded into said threaded opening whereby an axial preload may be applied to the toggle member by selective rotation of the bolt.

8. A two fault tolerant releasable coupling device as set forth in claim 3 further including means for locking said annular bolt from axial rotation after the preload has been applied to thereby maintain a constant preload.

9. A two fault tolerant releasable fastener for releasably joining separable structures, said fastener comprising:
   a fastener plate and a fastener body, each of which is separately attachable to a different one of the structures to be joined;
   a toggle member for releasably fastening the fastener plate to the fastener body, said toggle member being supported at a first end by the fastener plate and mounted thereon by a swivel coupling for universal pivotal movement about said first end, said fastener body having an opening in the face disposed towards the fastener plate of a size sufficient to receive a second end of the toggle member while allowing limited pivotal movement of the toggle member about the first end which is supported by the fastener plate, said second end of the toggle member having latching surfaces;

three latch hooks arranged in symmetrical equiangular spacing about said second end portion of the toggle member, each latch hook being mounted on said fastener body for pivotal movement between an unlatching position in noncontact relation with said toggle member and a latching position wherein each said latch hook is in engagement with a different one of the contact latching surfaces of the toggle member;

means for selectively applying an axial preload on the toggle member when the fastener plate and fastener body are coupled together by the toggle member; and means for releasably locking each said latch hook in said latching position wherein the toggle member couples said fastener plate to said fastener body and whereby the unlocking of at least one of the latch hooks from its latching position results in the decoupling of the fastener plate from said fastener body.

* * * * *